US010552919B2

(12) United States Patent
Brunn et al.

(10) Patent No.: US 10,552,919 B2
(45) Date of Patent: *Feb. 4, 2020

(54) CONDUCTING VARIOUS ACTIONS INDICATED BY A FINANCIAL CARD

(75) Inventors: Jonathan F. Brunn, Logan, UT (US); Robert W. Campion, Drumree (IE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/569,588

(22) Filed: Aug. 8, 2012

(65) Prior Publication Data

US 2014/0046782 A1 Feb. 13, 2014

(51) Int. Cl.
*G06Q 50/00* (2012.01)
*G06Q 20/20* (2012.01)

(52) U.S. Cl.
CPC ......... *G06Q 50/01* (2013.01); *G06Q 20/208* (2013.01)

(58) Field of Classification Search
USPC .......................................................... 705/17
See application file for complete search history.

(56) References Cited

U.S. PATENT DOCUMENTS

| | | | |
|---|---|---|---|
| 7,433,832 B1 | 10/2008 | Bezos et al. | |
| 7,949,579 B2 * | 5/2011 | Keld ...................... | G06Q 10/10 705/30 |
| 8,504,423 B2 * | 8/2013 | Rotbard ................ | G06Q 20/20 705/14.49 |
| 8,540,423 B2 | 9/2013 | Liu | |
| 2002/0062249 A1 * | 5/2002 | Iannacci ................ | G06Q 20/10 705/14.1 |
| 2009/0006239 A1 * | 1/2009 | Robinson ............... | G06Q 20/04 705/35 |
| 2009/0132366 A1 * | 5/2009 | Lam .................. | G06F 17/30699 705/14.36 |
| 2009/0192904 A1 * | 7/2009 | Patterson ............... | G06Q 20/20 705/17 |
| 2010/0169161 A1 | 7/2010 | Sacco | |
| 2010/0318435 A1 | 12/2010 | Ramanathan et al. | |

(Continued)

FOREIGN PATENT DOCUMENTS

| | | |
|---|---|---|
| JP | 2003-132395 A | 5/2003 |
| WO | 2012/016199 A | 2/2012 |

OTHER PUBLICATIONS

IP.com (Tying in Store Discounts to Social Media Posts); Disclosed Anonymously, dated Oct. 14, 2011.*

(Continued)

*Primary Examiner* — Luna Champagne
(74) *Attorney, Agent, or Firm* — Anthony V. England; Edell, Shapiro & Finnan, LLC

(57) ABSTRACT

An indicator associated with a financial card to tender payment for a transaction is received from a point of sale device. A storage device stores independent sets of information associated with the financial card. The sets of information indicate different actions to be performed and settings corresponding to the actions. The indicator received from the point of sale device is associated with one of the independent sets of information. The actions associated with the received indicator are performed in accordance with the corresponding settings in response to conducting a transaction with the financial card.

20 Claims, 7 Drawing Sheets

(56) References Cited

U.S. PATENT DOCUMENTS

| | | | |
|---|---|---|---|
| 2011/0010254 A1* | 1/2011 | Chenot | G06Q 20/204 |
| | | | 705/17 |
| 2011/0276385 A1 | 11/2011 | Keller | |
| 2011/0313872 A1 | 12/2011 | Carter et al. | |
| 2012/0028702 A1* | 2/2012 | Mullen | G06Q 20/347 |
| | | | 463/25 |
| 2012/0029990 A1 | 2/2012 | Fisher | |
| 2012/0029992 A1 | 2/2012 | De Facendis | |
| 2012/0209472 A1 | 8/2012 | Schofield et al. | |
| 2012/0209744 A1* | 8/2012 | Mullen | G06Q 30/02 |
| | | | 705/26.41 |
| 2012/0290472 A1 | 11/2012 | Mullen et al. | |
| 2012/0303425 A1* | 11/2012 | Katzin et al. | 705/14.4 |
| 2014/0006188 A1* | 1/2014 | Grigg | G06Q 20/20 |
| | | | 705/17 |
| 2014/0046782 A1 | 2/2014 | Brunn et al. | |
| 2014/0046783 A1 | 2/2014 | Brunn | |
| 2014/0337175 A1* | 11/2014 | Katzin | G06Q 20/204 |
| | | | 705/26.62 |

OTHER PUBLICATIONS

"Tying in Store Discounts to Social Media Posts", ip.com, Oct. 14, 2011, 3 pages.

Yom-Tov et al., "Method and System for Improving Retrieval of Social Media Posts based on Location and Frequency of Posting on Social Media", ip.com, Dec. 8, 2011, 3 pages.

"Method and System for Discovering Hidden Relationships in Social Networks Based on Private Information", ip.com, May 17, 2011, 3 pages.

"Identifying a social Network User Identifier Based on a User Message", ip.com, Jul. 26, 2010, 31 pages.

"Blippy tells the world what you buy", http://articles.cnn.com/2010-01-21/tech/blippy.philip.kaplan_1_philip-kaplan, Jan. 21, 2010, 6 pages.

* cited by examiner

CONDUCTING VARIOUS ACTIONS INDICATED BY A FINANCIAL CARD

BACKGROUND

1. Technical Field

Present invention embodiments relate to financial transactions, and more specifically, to conducting various actions indicated by a financial card in response to a financial transaction. These actions may include providing information regarding financial transactions (purchases of goods and/or services) by a financial card (credit or debit card) to a public or semi-public forum, such as a social media environment.

2. Discussion of the Related Art

Posting information regarding transactions made by a financial card has been developed. However, currently prevailing technology is limited by a number of different factors. For example, some systems require third party access to consumer financial card records, which are analyzed and pertinent information may be subsequently posted. The delay between the analysis of the transaction records and the posting of the transactions may adversely affect time critical marketing strategies. Other systems have no point of sale (POS) mechanism for deciding what is to be posted. Moreover, existing approaches fail to leverage rebates and other incentives in exchange for posts resulting in lackluster adoption of systems that automatically post transactions.

Providing POS mechanisms to accommodate more interchange of information and to allow card holders to enter or provide additional information during a transaction may be achieved, but at the cost of hardware replacement and/or software upgrades to implement suitable protocols at the point of sale.

BRIEF SUMMARY

According to one embodiment of the present invention, an indicator associated with a financial card to tender payment for a transaction is received from a point of sale device. A storage device stores independent sets of information associated with the financial card. The sets of information indicate different actions to be performed and settings corresponding to the actions. The indicator received from the point of sale device is associated with one of the independent sets of information. The actions associated with the received indicator are performed in accordance with the corresponding settings in response to conducting a transaction with the financial card.

DETAILED DESCRIPTION

Figure 1:
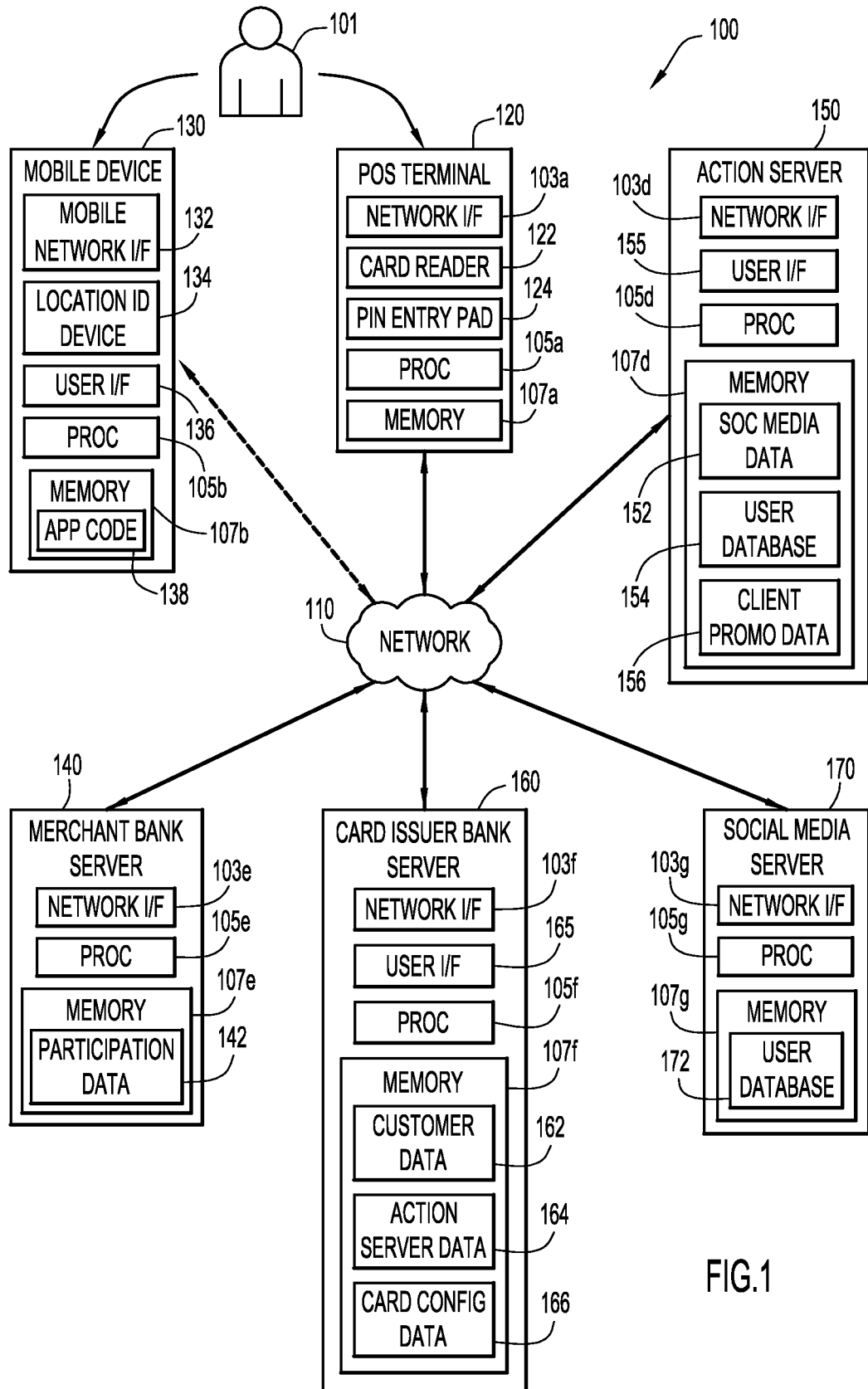
FIG. 1 is a schematic block diagram of a distributed processing environment by which the present invention may be embodied.

Present invention embodiments provide a financial card that indicates the actions to perform in response to a financial transaction. The actions may include posting information pertaining to the financial transaction to a social media site and/or associating certain categorization, metadata, tags or markings with the transaction. Thus, present invention embodiments provide point of sale social media integration to allow consumers to make point of sale decisions. These activities are achieved using existing point of sale protocols, fundamental interchange and financial clearing mechanisms.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary, when used herein, is intended to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

Other terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

FIG. 1 is a schematic block diagram of a distributed processing system 100 by which the present invention may be embodied. Processing system 100 includes several interoperating processing units, to be described separately below, comprising network interfaces 103a-103g, representatively referred to herein as network interface(s) 103, processors 105a-105g, representatively referred to herein as processor(s) 105, and memories 107a-107g, representatively referred to herein as memory or memories 107. Network interfaces 103 implement the communication mechanisms by which the processing units communicate with one another over a communication network 110. Network 110 may be implemented by any number of any suitable communications mechanisms and media, e.g., wide area network (WAN), local area network (LAN), Internet, Intranet, etc.

Processors 105 may implement data processing functionality of the respective processing units as well as control functions by which the individual processing units can both autonomously operate and interoperate with other processing units. For example, processors 105 may be microprocessors executing processor instructions stored in memory 107 to which it is coupled. In addition to processor instructions, memory 107 may also store data on which data processing operations are performed. It is to be understood that network interfaces 103, processors 105 and memories 107 may be constructed in a wide variety of fixed and programmable circuitry; the present invention is not limited to any particular implementation thereof. The ordinarily skilled artisan will readily recognize the roles of each of these elements upon review of this disclosure.

The present invention may utilize an electronic payment infrastructure, such as that by which payment for goods and services are made with a financial card, such as credit cards, debit cards, gift cards, and the like. As such, processing system 100 may include a point-of-sale (POS) terminal 120 at which payment by a user 101 is initiated. To do so, a financial card issued to user 101 may incorporate computer readable media, such as, for example, a magnetic stripe, radio-frequency identification (RFID) or near field communication (NFC) devices, that can be read by a suitable device, such as, for example, magnetic stripe or smart card reader 122 in POS terminal 120. POS terminal 120 may further include a data entry pad 124, by which, if prompted, a consumer 101 enters a personal identification number (PIN).

POS terminal 120 may be communicatively coupled to a merchant bank server 140 via network 110, which carries out financial transactions on behalf of the merchant using POS terminal 120. Card issuer bank server 160 may also be communicatively coupled to network 110 to carry out financial transactions on behalf of the consumer per cardholder agreements established between consumer 101 and the card issuing bank.

Overlapping with the payment infrastructure in present invention embodiments is one or more social content distribution systems, such as implemented by, for example, TWITTER, FACEBOOK, LINKEDIN, etc. Embodiments of the present invention enable consumer 101 to associate distributing transaction information to social media sites, representatively illustrated at social media server 170, using features associated with the consumer's financial card account, e.g., debit card or credit card that is assigned a PIN for use at POS terminals. In certain implementations, merchants can pay extra interchange or add-on fees to the merchant's bank and/or the card issuer bank, and have a discount passed on to the consumer as an incentive, e.g., a discount, reward, rebate, etc., to post to social media sites about a real purchase made. The card issuer may take a percentage of that discount as well or charge a fee for offering such service to retailers. These discounts may be made available when the merchant and card issuer use the same bank, or the card issuing bank may offer such a service for additional interchange fees billed to the merchant bank. As such, merchant bank server 140 may have stored thereon program participation data that tracks and facilitates incentive programs cooperatively with the card issuing bank's mechanisms for such.

Figure 2A:
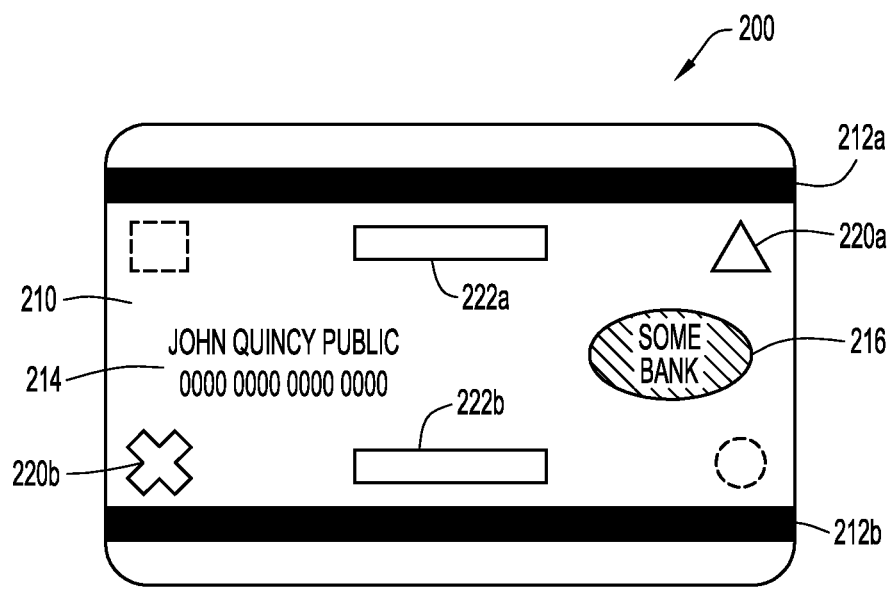
FIGS. 2A-2B are illustrations of an example financial card embodiment suitable to embodiments of the present invention.
Figure 2B:
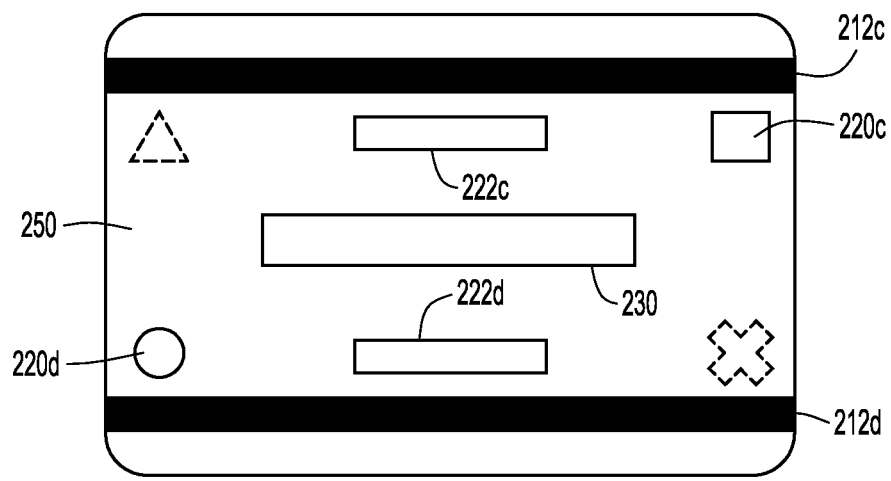

Present invention embodiments allow consumer 101 to assign unique PINs to a financial card or, in the case of a credit card not protected by a PIN for purchases, a card may have different magnetic stripes, one on separate edges of the card. Such a financial card is illustrated in FIGS. 2A-2B, collectively referred to herein as FIG. 2. FIG. 2A is an illustration of an obverse side 210 of a financial card 200 and FIG. 2B is an illustration of a reverse side 250 of the financial card 200. As is typical with such financial cards, financial card 200 may include customer information 214, such as customer name and card number, issuing bank information 216, such as a bank logo, and a signature strip 230 in which the consumer's signature is recorded for identity verification purposes. Financial card 200 may include one or more magnetic stripes 212a-212d, representatively referred to herein as stripes 212. Each stripe 212 may have stored thereon data by which a financial transaction may be carried out and additional information associated with customer options and preferences regarding disclosure of financial transactions to third parties, such as a social website posting. As illustrated in FIG. 2, card 200 includes four (4) stripes 212 and, accordingly, a customer can configure four (4) sets of settings as to how, where and what to disclose to such third parties. For ease of distinguishing stripes 212 from one another, card 200 may include small write-in fields 222a-222d, by which the consumer can label individual stripes 212. Card 200 may also include four (4) different raised shapes, such as triangle 220a, cross 220b, square 220c and circle 220d by which a visually impaired customer can distinguish the edges of the card. As illustrated in FIG. 2, one set of shapes, e.g., triangle 220a and cross 220b, are raised on one side 210 and the remaining set of shapes, e.g., square 220c and circle 220d, are raised on the opposite side 250.

Present invention embodiments in which a single stripe 212 is disposed on card 200 or when a single PIN is assigned to a card, a financial transaction may be carried out in conventional fashion. In embodiments where another PIN or stripe 212 is associated with card 200, user-selected actions can be carried out when the PIN or stripe 212 is used to initiate the transaction. For example, one such action allows user-selected details regarding the transaction to be publicly or semi-publically disclosed, such as by a posting to one or more selected social sites. By using a special PIN or stripe 212 on an edge of card 200, the consumer notifies their social community that they are, for example, having coffee in a particular coffee shop and where that coffee shop is located. Present invention embodiments afford great latitude in configuring different settings for how to handle particular transactions through extra PINs assigned to financial card 200 or by additional stripes 212 disposed on financial card 200. For example, other actions may include marking whether a transaction as reimbursable, making other reimbursement classifications at the point of sale, or marking the transactions with different accounting codes, such as when corporate credit cards allow charging one department vs. another. Consumers decide at the point of sale what action associated with a given transaction will be performed. It is to be understood that while the example embodiments described herein are presented in a social media context with posting transaction details as a basic action, the ordinarily skilled artisan will recognize numerous actions that can be performed and numerous other contexts in which such actions can be performed upon review of this disclosure Present invention embodiments allow a card holder to authorize sharing its social media account information, as might be stored in user database 172, with merchants. Such may be configurable by way of the PINs/stripes associated with financial card 200. Merchants may purchase services from, for example, the card issuer, that provide access to consumer social media information. Merchants may optionally offer discounts to the consumer for permitting such access. These discounts can be offered or advertised at the point of sale to encourage the card holder to share their basic social media information through the transaction. Provided the merchant has registered for this service with the card issuer, and the card holder has likewise authorized the sharing through the use of settings associated with one or more of their PINs or stripes 212, the merchant receives basic social media account information about the card holder and may have access to web reports that make use of this information. For its part, the card issuer may automatically credit the card holder with any applicable discounts set up by the merchant, and may charge an additional interchange fee, or in the case the merchant and card issuer bank are the same, an add-on fee, on the transaction in addition to the cost of the consumer discount itself.

Returning to FIG. 1, card issuer bank server 160 may have stored in its memory 107 customer data 162, such as customer name and address, account number, account balance and other financial and personal data for carrying out purchases and other financial transactions, billing, etc. Card issuer bank server 160 may also store card configuration data 166 that contains information regarding each customer's financial card. Such information may include PIN data and what information is recorded on each stripe 212, such as an identifier of the stripe that can be associated to a particular action when the stripe is swiped in card reader 122. Action server data 164 on card issuer bank server 160 may include information regarding action server 150, which facilitates the actions specified by the customer, as will be discussed below. Action server data 164 may include a network address of action server 150 as well as user controls, such as Web pages presented through user interface 165, by which user-specified actions may be configured. The card issuer may also track transactions that have been posted to social media sites. Such information and settings may be made available to card holders through user interface 165, which may implement a Web server, and may be stored in customer database 162.

Action server 150 facilitates the actions performed in response to financial card related input, such as a swipe in card reader 122 and/or PIN input on entry pad 124. In certain embodiments, action server 150 may be a component of the card issuer bank server 160. Action server data 164 in memory 107*f* of card issuer bank server 160 may include data by which communications with action server 150 can be carried out, such as a network address and protocol information. In other embodiments, action server 150 may be operated and controlled by a third party service, referred to herein as an action service, and, when so embodied, may be accessible by action service account holders through user interface 155. Action server 150 may have stored in memory 107*d* social media data that may include network addresses of one or more social media servers 170 and message templates for formatting posts for different social media sites. Additionally, memory 107*d* may include a user database 154 that contains user information, such as social media account data.

Figure 3:
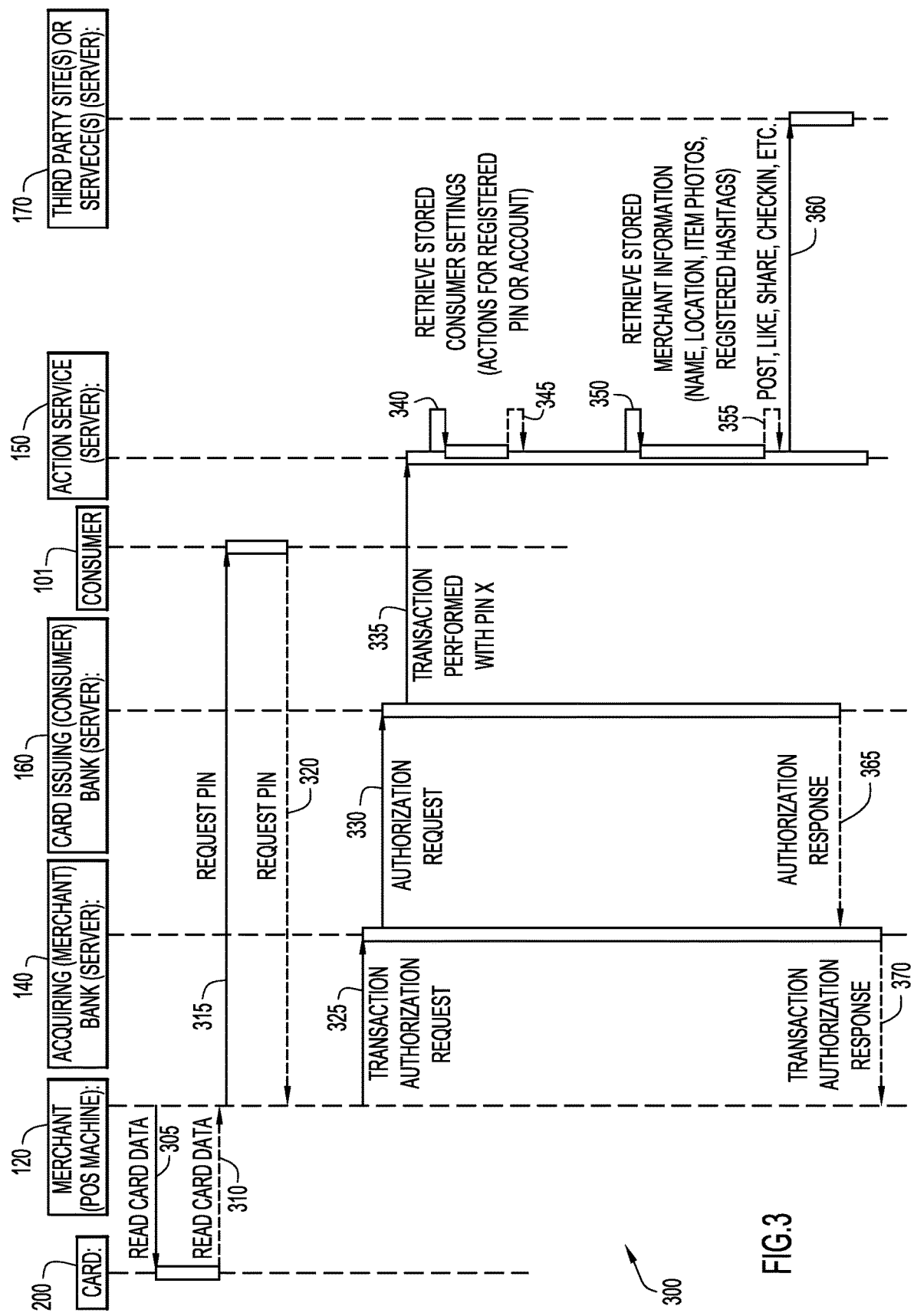
FIG. 3 is a procedural flowchart of a financial transaction with social media posting by which the present invention may be embodied.

FIG. 3 illustrates a social media disclosure method 300 by which the present invention may be embodied. In operation 305, a transaction is initiated by POS terminal 120 requesting data from card 200, which is provided to POS terminal 120 in operation 310, such as by swiping card 200 in card reader 122. In operation 315, POS terminal 120 may request a PIN from consumer 101, which is provided to POS terminal 120 by consumer 101 in operation 320, such as through entry pad 124. That is, consumer 101 enters the PIN associated with the type of action to be performed. Alternatively or additionally, consumer 101 may swipe a particular edge of card 200 on which a magnetic stripe 212 is disposed corresponding to the action that is to be performed. Once in possession of a PIN or stripe information, POS terminal 120 sends a suitably formatted transaction authorization request to merchant bank server 140 in operation 325. Merchant bank server 140 forwards the authorization request in card issuer bank server 160, which consults customer data 162 to determine, among other things, whether a valid PIN has been entered or whether the authorization request is valid and whether sufficient funds are available to complete the transaction. The results of such determination, i.e., whether the transaction has been authorized or denied, is provided from card issuer bank server 160 to merchant bank server 140 in operation 365 and then to POS terminal 120 in operation 370.

In addition to the previously described financial transaction, a disclosure action may be performed concurrently. In operation 335, the type of transaction and the corresponding PIN used for authorization or an identifier thereof are provided to action server 150. Upon receipt of such information, action server 150 may request the customer preferences associated with the PIN and obtain the customer preferences in operation 345. In operation 350, a request for other information, such as information regarding the merchant at which the transaction was performed, is initiated. The merchant information may be obtained in operation 355. In operation 360, all pertinent information gathered in operations 340-355 are formatted into a suitable message and transmitted to the appropriate third party system, such as social media server 170, where the transaction information is posted in accordance with user preferences.

In certain embodiments, such as where integrated circuit carrying smart cards are used, transaction protocols allow PINs to be verified at POS terminal 120 without requiring PIN verification by card issuer bank server 160. Memory on the card (not illustrated) may include security information, such as digital certificate data, by which the user's identity can be verified at POS terminal 120. When so embodied, the transaction protocol may send a string of text generated by POS terminal 120 from information on the smart card chip to card issuer bank server 160 or action server 150. Such a string can include not only information for the card issuing bank to confirm the transaction, but may also contain an identifier associated with the PIN used, while excluding the actual PIN for security reasons. For example, the authorization request may include a text string such as, for example, "User entered PIN #1", instead of, "User entered 1234 as PIN". Here, the integrated circuit in the card is configured with knowledge that 1234 is PIN #1, which is verified at POS terminal 120, and card issuer bank server 160 or action server 150 stores an association with the identifier of PIN #1 with a certain set of actions, which is performed without requiring the validation of the actual PIN itself.

Figure 4:
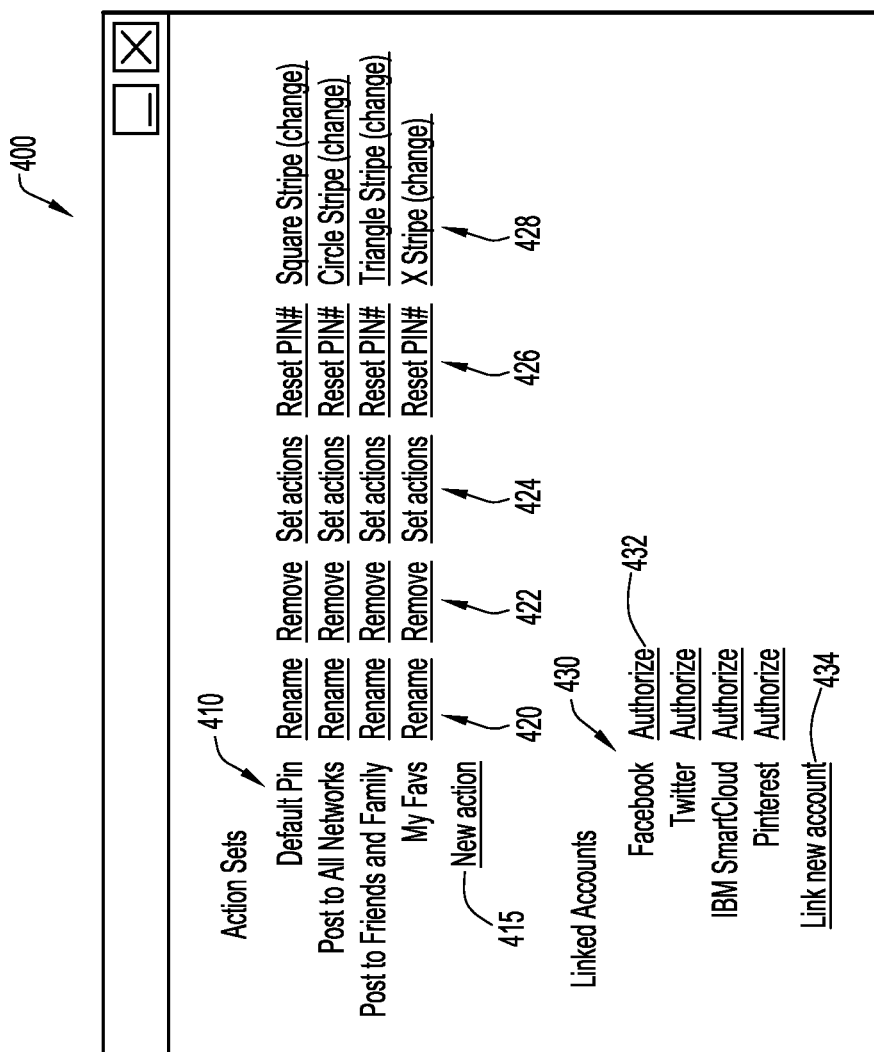
FIG. 4 is an illustration of a user control by which user-defined social media actions may be configured in embodiments of the present invention.

FIG. 4 is an illustration of a user control in the form of a Web page 400, which may also be implemented by a mobile application interface, that affords user control over information distribution preferences. Web page 400 includes one or more action sets 410 by which a cardholder can configure responses to activities at POS terminal 120. The card holder may link social media accounts, illustrated at linked accounts control 430, with actions or groups of actions assigned to a certain PIN or one of card stripes 212. Web page 400 and other user controls may be a separate user interface controlled by action server 150, or may be integrated into the card issuer bank server account management facilities communicating with action server 150 through a programmatic service interface. Alternatively or additionally, the user interface may be rendered by the action service, such as through user interface 155, and may be included dynamically into the card issuing bank's Website controls.

Action Sets control 410 lists actions that have been previously configured by the user to distribute transaction information. New actions may be created by activation of New Action control 415 and existing actions may be renamed, by activation of Rename control 420, removed by activation of Remove control 422 and edited by activation of Set Actions control 424. PINs may be reset by activation of Reset PIN # control 426 and assignment of actions to different magnetic stripes 212 may be changed by Stripe control 428.

A user may add to the list of Linked Accounts by actuating Link New Account control 434, which may instantiate a data entry control (not illustrated) by which social media account information, e.g., username, password, Uniform Resource Locators, Internet Protocol addresses, etc. may be provided. Linked social media accounts may then authorized by activating Authorize control 432, which allows postings to be made to the account in accordance with user preferences.

Figure 5:
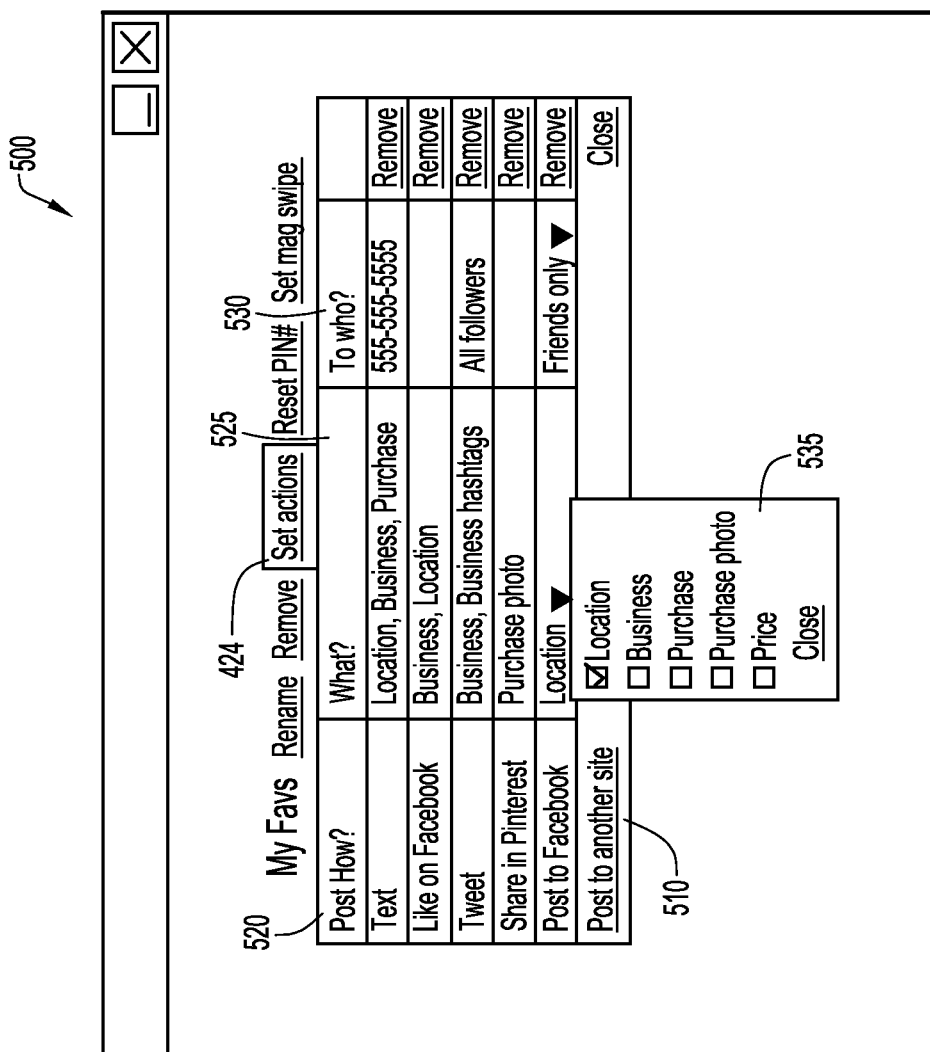
FIG. 5 is another illustration of a user control by which user-defined social media actions may be configured in embodiments of the present invention.

FIG. 5 illustrates another user interface control in the form of a Web page 500 by which actions are configured. In the example of FIG. 5, the Set Actions control 424 of the My Favs action set illustrated in FIG. 4 has been activated to instantiate an action configuration control 510. Action configuration control 510 may include a control 520 by which a user can establish how transaction information is disseminated, a control 525 by which a user can establish what information is published and a control 530 by which the user can specify the community to which the information is published. Each control 520, 525 and 530 may, upon activation, instantiate an option control 535 listing a number of options available for the corresponding field. The ordinarily skilled artisan will recognize that, although only a few options are illustrated in FIG. 5, numerous options can be implemented in embodiments of the present invention without departing from in spirit and intended scope thereof.

Figure 6:
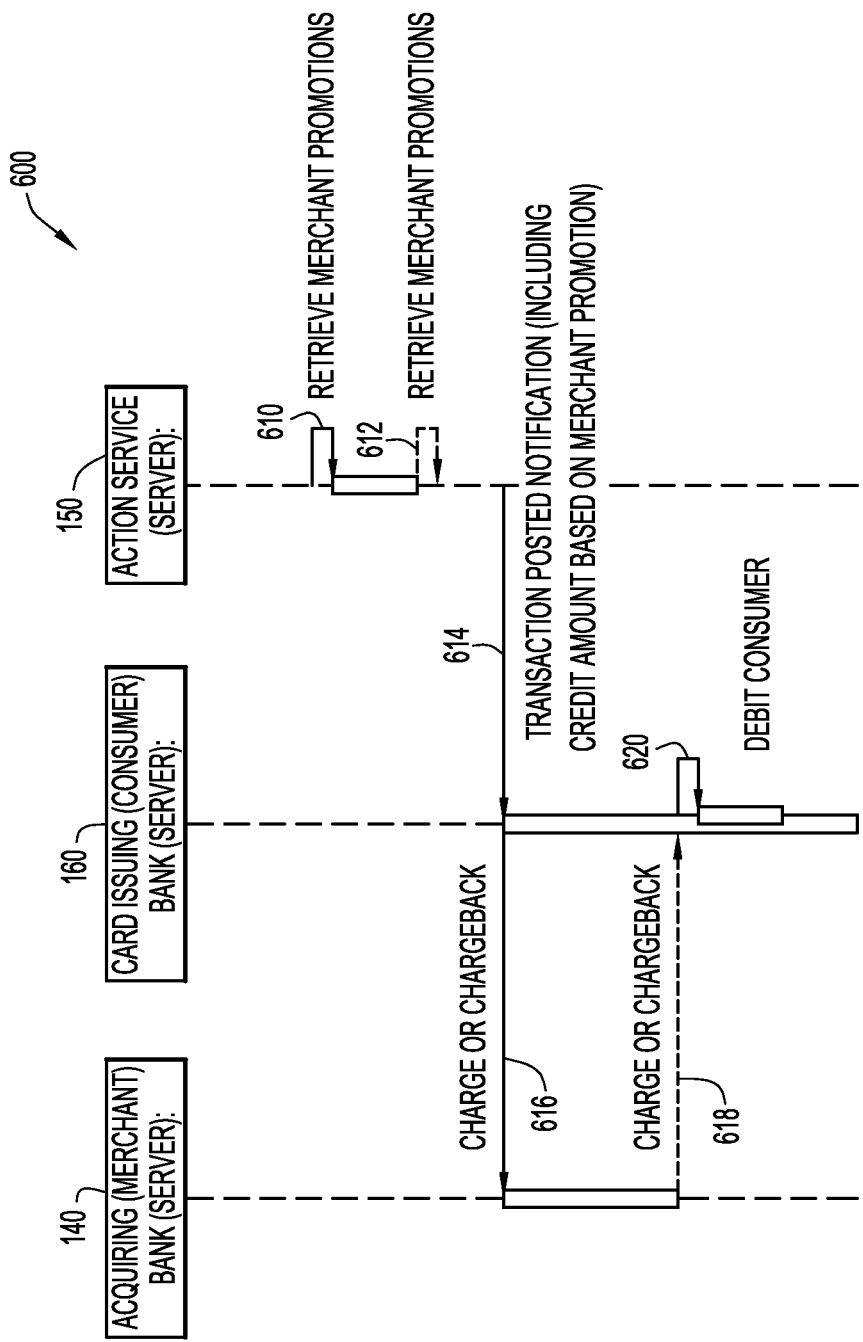
FIG. 6 is a procedural flow chart of a rebate transaction in accordance with embodiments of the present invention.

FIG. 6 is a flow diagram of a process 600 by which consumer credit is issued as a result of posting to the social media account. Process 600 may be performed either immediately following the transaction process, e.g., process 300 illustrated in FIG. 3, or after some time has passed and action server 150 has determined from the consumer's social media account that the original post is still published. As illustrated in FIG. 6, action server 150 determines in operation 610 whether the merchant has an account and has set up promotions. A promotion allows the merchant to designate refunds or other promotional consideration for the user's posting to a social media account. For example, the merchant may designate that a consumer gets 5% back for posting about a transaction or may designate that every 10th posted transaction up to a certain amount is free. A promotion for which the consumer may be qualified may be obtained in operation 612. Upon calculating any credits to the consumer, action server 150 notifies the card issuing bank server 160, in operation 614, an amount to which the consumer is entitled and sends a rebate request or the like to the merchant bank server 140 in operation 616. The merchant bank server 140 may then issue a credit or coordinate a charge or chargeback to the merchant. In certain embodiments, the merchant may configure an account with the action service, and the rebates may actually be a new charge to the merchant or may be a chargeback against the original transaction. The card issuing bank then debits the consumer credit balance by an appropriate amount. It is to be understood that the charge or chargeback to the merchant need not equal the debit amount. The card issuing bank may effectively charge the merchant by issuing a debit less than the credit amount, in accordance with prior agreements set up through the action service.

Figure 7:
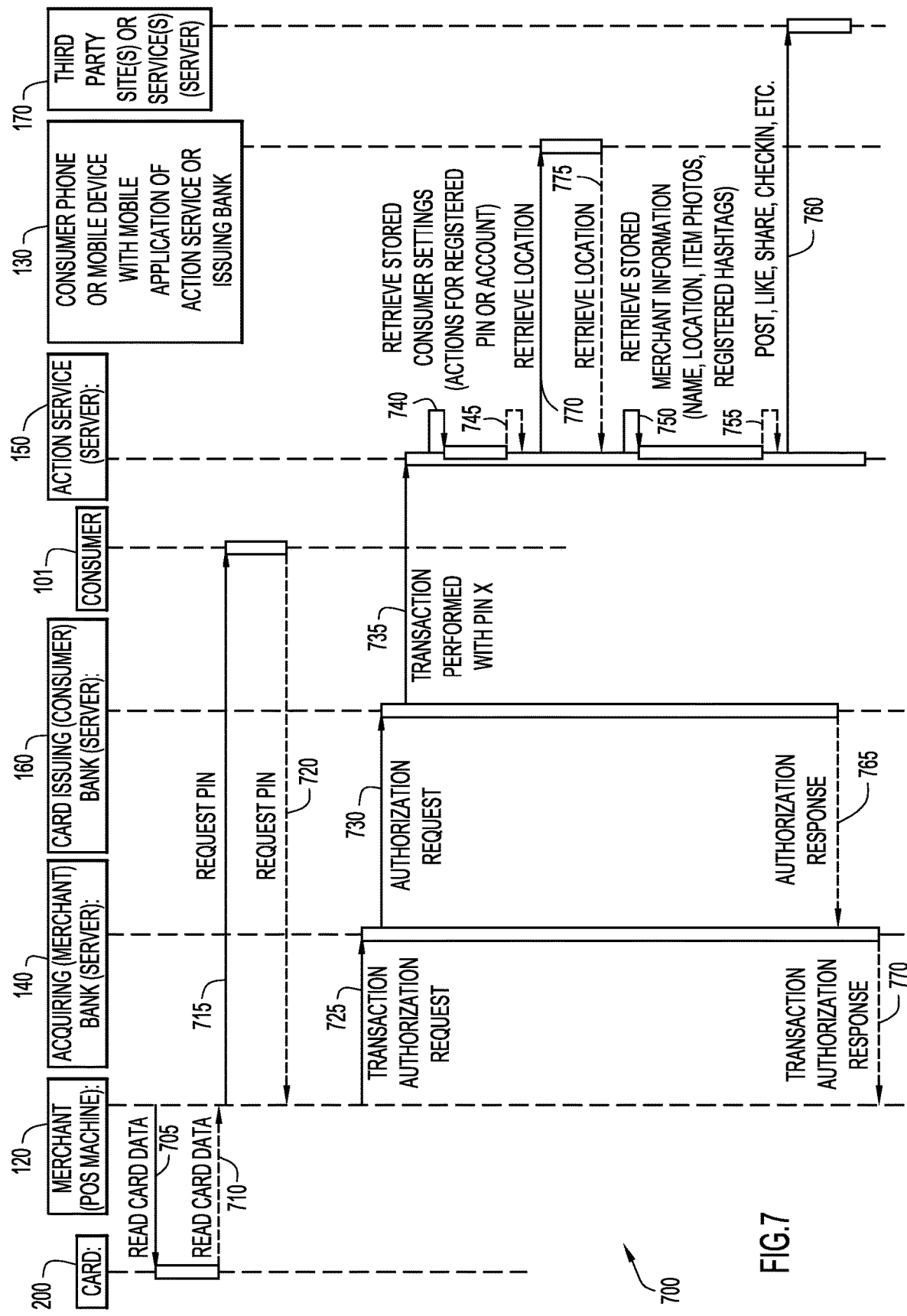
FIG. 7 is a procedural flowchart of a geo-tagged financial transaction with social media posting by which the present invention may be embodied.

Referring once again to FIG. 1, there is illustrated that user 101 may be in possession of a mobile device 130, such as a smartphone, mobile computer, etc. Mobile device 130 may include a mobile network interface 132 by which communications may be conducted over a wireless communication network, such as a cellular communication network (not illustrated). The cellular network may be communicatively coupled to network 110, such as by a suitable gateway or the like. Mobile device 130 may implement a user interface 136 through which consumer 101 operates mobile device 130, communicates over network 110 and interacts with applications, the code for which may be stored as application processor instructions 138 in memory 107*b*. Additionally, mobile device 130 may include a location identification device 134, such as a global positioning system (GPS) receiver, by which the location of mobile device 130 and, presumably that of consumer 101, may be ascertained. When so embodied, a mobile application 138 executing on mobile device 130 may allow the incorporation of location data provided by location ID device 134 into the social media stream. FIG. 7 is a flow diagram of how such location data may be incorporated, where operations 705-745 and 750-770 may be carried out in a manner similar to the corresponding operations illustrated and described with reference to FIG. 3. Present invention embodiments may allow merchants to register their location with card issuer bank server 160 and/or action server 150 for the additional benefit of social media posts being geo-tagged, i.e., including location specific data. In operation 770 action server 150 may query mobile device 130 for location data and, in operation 775, mobile application 138 responds with the device location to card issuer bank server 160. The card holder may set up zero or more of their special PINs and/or stripes to make use of the geo-tagging service. For example, only when one of the preset PINs or stripes configured for geo-tagging and such PIN or stripe is selected during the transaction does the card issuer request the device location. Transactions conducted using other PINs/stripes do not initiate a push notification to the device. A related mechanism may also be used to prevent fraud at brick and mortar merchants by verifying that the physical location of mobile device 140 is in close proximity to location at which the transaction is conducted.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for performing desired actions in response to conducting transactions with a financial card issued to a cardholder, the system comprising:
   a memory configured to store:
      a plurality of independent sets of information associated with respective indicators of the financial card, the plurality of independent sets of information including a first set of information comprising data defining one or more actions to tender payment for a transaction without posting to a social media network, and a plurality of second sets of information;
   wherein each second set of information comprising data defining:

one or more actions to tender payment for the transaction, one or more actions to geo-tag information for posting to the social media network, wherein the geo-tag includes a location of the cardholder retrieved from a mobile device of the cardholder;

one or more actions that are performed separately from tendering payment for the transaction to post information associated with the transaction automatically to the social media network, each of the actions specifying one or more entities to which information regarding the transaction is disseminated; and one or more settings according to which the corresponding actions are carried out, wherein the one or more settings comprise settings for the social media network;

wherein each of the first and second sets of information tender payment that is verified against a financial account;

a user interface comprising a configuration control configured to access the memory and modify the plurality of sets of information in accordance with user input on the configuration control independently of conducting the transaction; and a processor configured to:
receive, from a point of sale device reading the financial card at a merchant location for a purchase transaction, one of the indicators of the financial card to indicate user selection of one of the sets of information;

in response to the received indicator indicating the first set of information:
retrieve, from the memory, the first set of information; and
perform the one or more actions defined in the retrieved first set of information to tender payment for the purchase transaction without posting to the social media network;

in response to the received indicator indicating one of the second sets of information:
retrieve, from the memory, the indicated second set of information for the purchase transaction;

perform the one or more actions defined in the retrieved second set of information to tender payment for the purchase transaction, wherein the one or more actions defined in the retrieved second set of information to tender payment for the purchase transaction include:
verifying the location from the mobile device with the location of the point of sale device to authorize payment for the purchase transaction;

perform the one or more actions defined in the retrieved second set of information to geo-tag information for posting to the social media network, wherein the geo-tag includes the location of the cardholder retrieved from the mobile device of the cardholder; and perform the one or more actions defined in the retrieved second set of information to post information associated with the purchase transaction automatically to the social media network, wherein the posted information includes the geo-tagged information and tendering payment for the purchase transaction is performed concurrently with the posting to the social media network.

2. The system of claim 1, wherein the financial card comprises a plurality of storage media each associated with a corresponding independent set of information for performance of corresponding different actions, and the indicator associated with the set of information being retrieved from a cardholder-selected one of the storage media.

3. The system of claim 2, wherein the storage media comprise magnetic stripes.

4. The system of claim 3, wherein the magnetic stripes are distributed on respective edges of the financial card and the processor is configured to:
retrieve the indicator from the magnetic stripe on a cardholder-selected edge of the financial card to thereby select the corresponding independent set of information for performance of the corresponding different actions.

5. The system of claim 2, wherein the storage media comprise an electronic memory circuit.

6. The system of claim 1, wherein the indicators each comprise a personal identification number associated with a corresponding independent set of information for performance of different actions, and the processor is configured to perform the one or more actions in the corresponding set of information associated with the received personal identification number.

7. The system of claim 1, wherein the indicators comprise an account number and personal identification number to enable payment for the transaction in accordance with a protocol utilized by the point of sale device.

8. The system of claim 1, wherein the indicators comprise respective identifiers of personal identification numbers that are selected by the cardholder at the point of sale device, the identifier of each of the personal identification numbers excluding the personal identification number.

9. The system of claim 1, wherein the processor is configured to:
accept cardholder specifications of the one or more actions through the configuration control that specify parameters for a communication channel through which the information regarding the transaction is publicly disseminated.

10. The system of claim 1, wherein the processor is configured to:
accept cardholder specifications of the one or more actions through the configuration control that specify what information regarding the transaction is publicly disseminated.

11. The system of claim 10, wherein the processor is configured to:
accept cardholder specifications of the one or more actions through another configuration control that specifies a community to which the information is publicly disseminated.

12. The system of claim 1, wherein the processor is configured to:
in response to the posting to the social media network of the information associated with the purchase transaction:
wait for a predetermined period of time;
after passage of the predetermined period of time, determine that the posted information associated with the purchase transaction is still published on the social media network; and
issue a credit to the financial account associated with the financial card, wherein an amount of the credit represents a discount provided by the merchant for the purchase transaction.

13. The system of claim 1, further including a second processor at the point of sale device, wherein the financial card includes security information to verify an identity of a user, and the second processor is configured to:

verify, at the point of sale device, the identity of the user based on the security information of the financial card in response to the user selection of one of the second sets of information;

wherein the processor is configured to:

perform the one or more actions in the retrieved second set of information including transmitting a request to a payment system to tender payment for the purchase transaction, wherein the request includes information generated by the second processor from the security information of the financial card to confirm the purchase transaction without validation of an actual personal identification number for the financial account.

14. A computer program product for performing desired actions in response to conducting transactions with a financial card issued to a cardholder, the computer program product comprising:

a computer readable storage medium having computer readable program code embodied therewith, the computer readable program code comprising computer readable program code configured to cause at least one processor to:

generate a configuration control on a user interface, the configuration control being configured to access a memory in which a plurality of independent sets of information associated with respective indicators of the financial card are stored, the configuration control being further configured to modify the plurality of sets of information in accordance with user input on the configuration control independently of conducting a transaction, the plurality of independent sets of information including a first set of information comprising data defining one or more actions to tender payment for the transaction without posting to a social media network, and a plurality of second sets of information;

wherein each second set of information comprising data defining:

one or more actions to tender payment for the transaction, one or more actions to geo-tag information for posting to the social media network, wherein the geo-tag includes a location of the cardholder retrieved from a mobile device of the cardholder;

one or more actions that are performed separately from tendering payment for the transaction to post information associated with the transaction automatically to the social media network, each of the actions specifying one or more entities to which information regarding the transaction is disseminated; and one or more settings according to which the corresponding actions are carried out, wherein the one or more settings comprise settings for the social media network;

wherein each of the first and second sets of information tender payment that is verified against a financial account;

receive, from a point of sale device reading the financial card at a merchant location for a purchase transaction, one of the indicators of the financial card to indicate user selection of one of the sets of information;

in response to the received indicator indicating the first set of information:

retrieve, from the memory, the first set of information; and perform the one or more actions defined in the retrieved first set of information to tender payment for the purchase transaction without posting to the social media network;

in response to the received indicator indicating one of the second sets of information:

retrieve, from the memory, the indicated second set of information for the purchase transaction;

perform the one or more actions defined in the retrieved second set of information to tender payment for the purchase transaction, wherein the one or more actions defined in the retrieved second set of information to tender payment for the purchase transaction include:

verifying the location from the mobile device with the location of the point of sale device to authorize payment for the purchase transaction;

perform the one or more actions defined in the retrieved second set of information to geo-tag information for posting to the social media network, wherein the geo-tag includes the location of the cardholder retrieved from the mobile device of the cardholder; and perform the one or more actions defined in the retrieved second set of information to post information associated with the purchase transaction automatically to the social media network, wherein the posted information includes the geo-tagged information and tendering payment for the purchase transaction is performed concurrently with the posting to the social media network.

15. The computer program product of claim 14, wherein the financial card comprises a plurality of storage media each associated with a corresponding independent set of information for performance of corresponding different actions, and receiving the indicator comprises:

receiving the indicator associated with the set of information corresponding to desired actions from a cardholder-selected one of the storage media.

16. The computer program product of claim 15, wherein receiving the indicator from the storage media comprises receiving the indicator from magnetic stripes disposed on the financial card.

17. The computer program product of claim 15, wherein receiving the indicator from the storage media comprises receiving the indicator from an electronic memory circuit on the financial card.

18. The computer program product of claim 14, wherein the indicators each comprise a personal identification number associated with a corresponding independent set of information for performance of different actions, and receiving the indicator comprises:

performing the one or more actions in the corresponding set of information associated with the received personal identification number.

19. The computer program product of claim 14, wherein receiving the indicator comprises receiving from the indicator an account number and a personal identification number to enable payment for the transaction in accordance with a protocol utilized by the point of sale device.

20. The computer program product of claim 14, wherein the indicator comprises an identifier of a personal identification number that is selected at the point of sale device from a plurality of identifiers of respective personal identification numbers, the identifier of each of the personal identification numbers excluding the personal identification number.

* * * * *